Feb. 19, 1957 B. O. KRAUSE 2,781,692
MICROSCOPE SLIDE HOLDER
Filed Dec. 1, 1953
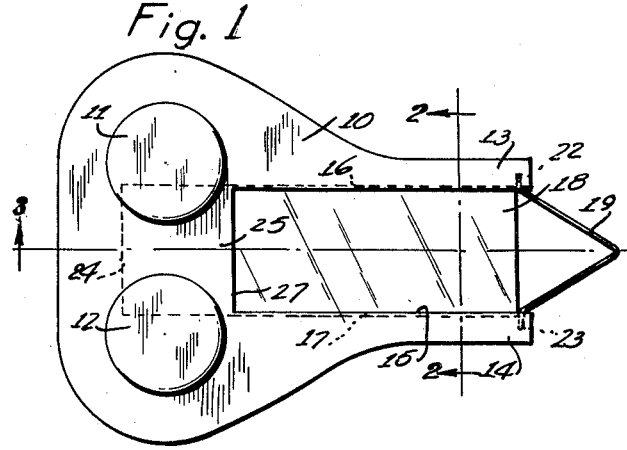
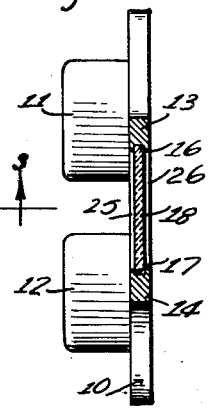
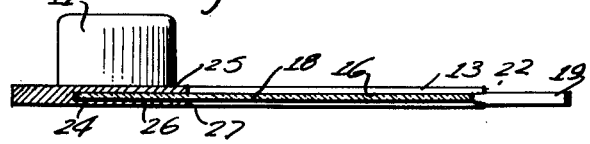
INVENTOR.
Björn O. Krause
BY *Victor J. Evans & Co.*
ATTORNEYS

2,781,692
MICROSCOPE SLIDE HOLDER

Björn O. Krause, East Orange, N. J.

Application December 1, 1953, Serial No. 395,514

1 Claim. (Cl. 88—40)

This invention relates to a holder for microscope slides particularly as used in a class room where slides are used by groups of students, and in particular a plate having an elongated opening with grooved edges for retaining a slide and with knobs or holding elements on one end to facilitate gripping the device for accurately positioning the slide in relation to the lens of a microscope.

The purpose of this invention is to facilitate gripping and holding slides of microscopes by hand to obviate the necessity of handling the individual slides in positioning the slides on the stage of a microscope and also in carrying slides from storage cabinets or containers to microscopes or from the microscopes to the containers.

Microscope slides are comparatively small and where it is necessary for a plurality of students to handle the slides, such as in a biology laboratory of a school where the slides are handled by one hundred or more students of a class finger marks leave heavy smudges particularly on the cover slip that seals the specimen in the slide, and also as the slides are comparatively thin it is difficult to grip the slide for positioning on the stage of the microscope with the thumb and forefinger of a hand. With this thought in mind this invention contemplates a plate having an elongated slot extended inwardly from one end with slide receiving grooves in edges of the slot and with finger gripping knobs extended upwardly from the upper surface of the plate to facilitate positioning the plate with a slide in the slot thereof on the stage of a microscope.

The object of this invention is, therefore, to provide a slide holder to protect slides from being damaged by gripping edges thereof, with the thumb or fingers of a hand.

Another object of the invention is to provide a slide holder that facilitates positioning slides on the stage of a microscope whereby fine structures of specimens may be located in relation to the lens of the microscope.

A further object of the invention is to provide a slide holder for positioning slides on stages of microscopes in which the holder is of a simple and economical construction.

With these and other objects and advantages in view the invention embodies a comparatively thin plate having an enlarged end with finger gripping knobs extended upwardly from the upper surface and with an elongated slot having parallel sides and having slide receiving grooves in the sides in which a slide may be retained with a spring clip or the like.

Other features and advantages of the invention will appear from the following description taken in connection with the drawing, wherein:

Figure 1 is a plan view of the holder.

Figure 2 is a cross section through the holder taken on line 2—2 of Fig. 1.

Figure 3 is a longitudinal section through the holder taken on line 3—3 of Fig. 1.

Figure 4 is a detail showing an end elevational view of a spring clip retaining a slide in the holder.

Figure 5 is a plan view of the spring clip shown in Fig. 4.

Referring now to the drawing wherein like reference characters denote corresponding parts the improved microscope slide holder of this invention includes a plate 10 having knobs 11 and 12 extended upwardly from the upper surface and having spaced arms 13 and 14 extended from one side providing an enlongated slot 15 and, as shown in Fig. 2 the inner surfaces of the arms providing the sides of the slot are provided with channel-shaped grooves 16 and 17, respectively in which a slide 18 is retained by a spring clip 19, extended ends 20 and 21 of which are positioned in notches 22 and 23, respectively in the ends of the arms 13 and 14 with the parts assembled.

As illustrated in Figs. 1 and 3 the slot 15 extends inwardly from the ends of the arms 13 and 14 to a point 24 and it will be understood that the slide may be located at any suitable position in the slot. In the design shown upper and lower surfaces, as indictaed by the numerals 25 and 26, extend over the inner end of the slot to the point 27 whereby the portion of the slide positioned to come in contact with fingers of a hand positioned on the knobs 11 and 12 is protected.

The slide holder or plate from which the slide is formed may be of any suitable shape or size and grooves may be provided to accommodate slides of different sizes. It is preferred to position the grooves in which the edges of the slides are held comparatively close to the lower surface of the slide so that the distance of the lens of the microscope from a specimen in the slide is not changed.

The spring clip 19, which is shown as formed of a flat piece of resilient material may also be formed in different designs.

After placing a slide in the holder the ends 20 and 21 of the clip are snapped into the notches 22 and 23 to secure the slide in the slot and the clip may be removed by squeezing the arms thereof together.

The holder is adapted to be placed on a stage or platform of a miscroscope and the position thereof is adapted to be adjusted by gripping the knobs 11 and 12 to slide the holder from one position to another.

It will be understood that modifications, within the scope of the appended claims, may be made in the design and arrangement of the parts without departing from the spirit of the invention.

What is claimed is:

A microscope slide holder for providing a means for handling and positioning microscope slides so that the microscope slides will be protected from wear and tear, comprising a plate including an enlarged section adjacent one end thereof, a pair of spaced parallel knobs adapted to be gripped in the fingers and said knobs extending upwardly from the enlarged section of said plate and secured thereto, there being a slot in said plate defining a pair of spaced parallel arms, each of said arms being provided with a channel shaped groove extending longitudinally along its inner surface for slidably receiving a microscope slide, the inner end of said slot being extended into the body of the plate beyond the inner end of said arms with the upper and lower portions of the plate being extended over the inner end of the slot, there being a pair of opposed notches in said arms adjacent the outer ends thereof, a spring clip made of resilient material and including a pair of diverging portions each terminating in an outwardly extended finger mounted for movement into and out of engagement with said notches for selectively retaining the slide in the slots and whereby the clip may be removed by squeezing the diverging portions together, said holder adapted to be placed on a stage or platform of a microscope and the position thereof adapted to be adjusted by gripping the knobs to move the holder from one position to another.

References Cited in the file of this patent

UNITED STATES PATENTS

| | | |
|---|---|---|
| 1,206,253 | Roan | Nov. 28, 1916 |
| 2,120,404 | Graff | June 14, 1938 |
| 2,175,343 | Cunningham | Oct. 10, 1939 |
| 2,549,830 | Logan | Apr. 24, 1951 |

FOREIGN PATENTS

| | | |
|---|---|---|
| 747,720 | Germany | Oct. 11, 1944 |